United States Patent
Lin (10) Patent No.: US 11,752,644 B2
(45) Date of Patent: Sep. 12, 2023

(54) ON-DEMAND PNEUMATIC SYSTEM FOR RECONFIGURABLE END EFFECTOR

(71) Applicant: GM GLOBAL TECHNOLOGY OPERATIONS LLC, Detroit, MI (US)

(72) Inventor: Yhu-tin Lin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 17/141,434

(22) Filed: Jan. 5, 2021

(65) Prior Publication Data
US 2022/0212353 A1    Jul. 7, 2022

(51) Int. Cl.
*B25J 15/06*    (2006.01)
*B25J 15/00*    (2006.01)

(52) U.S. Cl.
CPC ....... *B25J 15/0641* (2013.01); *B25J 15/0052* (2013.01)

(58) Field of Classification Search
CPC ............... B25J 15/0641; B25J 15/0052; B25J 15/0658; B25J 15/0071; B65B 35/36
USPC ............... 294/183, 185, 186, 188
See application file for complete search history.

(56) References Cited

U.S. PATENT DOCUMENTS

| | | | |
|---|---|---|---|
| 7,971,916 B2 | 7/2011 | Lin et al. | |
| 8,025,277 B2 | 9/2011 | Lin et al. | |
| 8,033,002 B2 | 10/2011 | Lin et al. | |
| 8,371,631 B2 | 2/2013 | Lin | |
| 8,496,425 B2 | 7/2013 | Lin et al. | |
| 8,684,418 B2 | 4/2014 | Lin et al. | |
| 8,702,340 B2 | 4/2014 | Lin et al. | |
| 8,857,877 B2 * | 10/2014 | Lin | B25J 15/0052 901/14 |
| 9,120,231 B2 | 9/2015 | Lin et al. | |
| 9,656,394 B2 * | 5/2017 | Lin | B25J 15/0408 |
| 9,682,484 B2 | 6/2017 | Lin et al. | |
| 9,808,933 B2 | 11/2017 | Lin et al. | |
| 2022/0033199 A1 * | 2/2022 | Secibovic | B25J 15/0061 |

FOREIGN PATENT DOCUMENTS

| | | |
|---|---|---|
| DE | 9016175 U1 | 6/1991 |
| DE | 4211014 C2 | 3/1995 |
| DE | 102004025781 B4 | 10/2006 |
| DE | 102012207249 B4 | 11/2016 |
| DE | 102018129041 A1 | 4/2020 |
| DE | 102020124757 A1 | 4/2021 |

* cited by examiner

*Primary Examiner* — Paul T Chin
(74) *Attorney, Agent, or Firm* — Lorenz & Kopf LLP (57) ABSTRACT

Systems are provided for gripping one or more workpieces. A tooling system includes a plurality of grippers configured to engage and grip the workpieces. An arm is connected with each gripper. A lock releasably locks each arm in a number of positions, including a home position. A pneumatic circuit is coupled with the grippers. A valve is disposed in the pneumatic power supply circuit and is positionable in an open state and in a closed state. When the arm is moved to the home position, in response the valve is mechanically moved to the closed state, idling the gripper.

20 Claims, 5 Drawing Sheets

ON-DEMAND PNEUMATIC SYSTEM FOR RECONFIGURABLE END EFFECTOR

INTRODUCTION

The present disclosure generally relates to reconfigurable manufacturing tooling with pneumatic grippers, and more particularly relates to systems with reconfigurable workpiece gripping tooling where the tooling that grips and holds an object may include mechanical features to flexibly change the gripping geometry for handling parts of different physical dimensions, while concurrently controlling pneumatic power supply during reconfiguration.

Workpiece manipulation has generally been accomplished by manual activities which include an innate ability to control the adaptability to varying shapes of objects to be handled. When mechanization takes the place of manual activities, the ability to control the adaptability to geometric shape is subject to the inherent limitations imposed by the layout and rigidity of mechanical tooling structures. When a tool, such as the end-of-arm tooling/end effector of a robot uses pneumatic power to grip the object, further limitations arise due to the need to accommodate the pneumatic supply to each gripper. A pneumatic gripper may operate to clamp onto a workpiece, may include a vacuum cup to contain suction for holding the workpiece to be manipulated, or may otherwise operate by mechanically moving components under power supplied by vacuum and/or positive pressure.

When pneumatic tooling is reconfigurable for adapting to different part geometries, the ability to adapt to different part shapes is limited by the layout of the various pneumatic grippers. A need exists for expanded ability to handle a wide range of part geometries with the same end effector/tooling. In addition, the use of pneumatic gripping power is desirable due to its efficiency and availability.

Accordingly, the ability of a tooling device to conform to a variety individual workpiece geometries and to grasp complex shapes is desirable. In addition, the ability to do so in a non-complex, efficient and light-weight manner is desirable. Furthermore, other desirable features and characteristics of the present invention will become apparent from the subsequent detailed description and the appended claims, taken in conjunction with the accompanying drawings and the foregoing technical field and background.

SUMMARY

Systems are provided for on-demand pneumatic control in reconfigurable tooling, such as an end effector.

In a number of embodiments, a tooling system includes grippers configured to engage and grip a workpiece. The grippers are connected with arms. A lock releasably locks the arms in a number of positions, including a home position. A conduit circuit is coupled with the grippers to communicate a pneumatic power from a pneumatic power supply. A number of valves are disposed in the conduit circuit and each is repositionable between an open state and a closed state. The arm's valve is configured to move to the closed state in response to moving the respective arm to the home position.

In additional embodiments, the pneumatic power is configured to be delivered to the grippers through the arms.

In additional embodiments, the valves includes push buttons configured to engage the tooling system to move the valves to the closed state when the valve's respective arm is moved to the home position.

In additional embodiments, the arms are connected with branch rails through the locks. The pneumatic power is communicated to the grippers through the branch rails.

In additional embodiments, the valves comprise two-position, on-off mechanically actuated valves.

In additional embodiments, the tooling system is an end effector of a robot. A tool changer interface releasably couples the end effector with the robot. A repositioning fixture interface releasably couples the end effector with a repositioning fixture.

In additional embodiments, the robot is configured to reposition the end effector when the end effector is coupled with a repositioning fixture, and to move one or more of the arms to the home position. Moving an arm to the home position closes the respective valve and idles the respective gripper while others of the plurality of grippers remain active.

In additional embodiments, each arm is part of a branch of the tooling system that is configured to be repositionable with five degrees of freedom.

In additional embodiments, each arm is connected with its respective branch rail through a respective lock. The branch rails are connected with the cross bar through branch locks, each of which includes a block. Each valve includes a push button actuator that is forced against the respective block when the respective arm is moved to the home position. The valve is disposed in a closed state when the push button is forced against the block.

In additional embodiments, the valves are mechanically actuated two position on-off valves.

In a number of additional embodiments, a tooling system for gripping workpieces includes a plurality of grippers configured to engage and grip the workpieces. An arm is connected with each gripper and a lock is connected with each of the arms. The locks releasably lock the arms in a plurality of positions, including home positions. A bolt on each of the locks alternately releases and locks the arm in each of the plurality of positions. A conduit circuit is coupled with the plurality of grippers and communicates a pneumatic power to the grippers. A valve on each one of the arms is disposed in the conduit circuit before each one of the plurality of grippers. Each valve is repositionable between an open state and a closed state. When an arm is moved to the home position, the valve on the arm is moved to the closed state in response to moving the arm to the home position.

In additional embodiments, the pneumatic power is delivered to each of the plurality of grippers through the arms.

In additional embodiments, the valves each include a push button configured to engage the tooling system to move the valve to the closed state when the arm on which the valve is disposed is moved to the home position.

In additional embodiments, the arms are connected with branch rails through the locks. The pneumatic power is communicated to the plurality of grippers through the branch rails.

In additional embodiments, each valve comprises a two-position, on-off mechanically actuated valve.

In additional embodiments, the tooling system is an end effector of a robot. A tool changer interface releasably couples the end effector with the robot. A repositioning fixture interface releasably couples the end effector with a repositioning fixture.

In additional embodiments, the robot is configured to reposition the end effector when the end effector is coupled with a repositioning fixture, and to move at least one of the arms to the home position. Moving an arm to the home position closes the valve on the arms and idles the gripper on the arm, while others of the plurality of grippers remain active.

In additional embodiments, each arm is part of a branch of the tooling system that is configured to be repositionable with five degrees of freedom.

In additional embodiments, the arms are connected with branch rails through the locks. The branch rails are connected with a cross bar through branch locks that include blocks. The valves include push button actuators that are disposed against one of the blocks when the valve's arm is moved to the home position, moving the valve to the closed state.

In a number of other embodiments, a tooling system for gripping workpieces includes a master boom, a crossbar coupled with the master boom, and branch rails coupled with the crossbar and selectively repositionable relative to the crossbar. Swing arms are included, one of which is coupled with each of the branch rails. Each swing arm is repositionable relative to its respective branch rail. A plurality of pneumatic grippers are included, one of which is coupled with each swing arm. A valve is included on each swing arm and is disposed in a conduit circuit between a respective pneumatic gripper and a pneumatic power supply. Each valve is repositionable between an open state and a closed state. A tool changer interface is included on the master boom to releasably couple with the robot. A repositioning fixture interface is included on the master boom to releasably couple with a repositioning fixture. The robot is configured to reposition the branch arms and the swing arms when the repositioning fixture interface is coupled with the repositioning fixture, and to move at least one of the swing arms to the home position. Moving a swing arm to the home position closes the valve on the arm, and idles the pneumatic gripper on the arm, while others of the plurality of pneumatic grippers remain active.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In various embodiments as disclosed herein, an on-demand pneumatic system is included in a reconfigurable tool, such as an end effector. Individual grippers/branches may be selectively and independently activated or inactivated/idled as the tooling configuration requires. Reconfiguration of the tooling locates a number of pneumatic powered grippers in three-dimensional space to provide secure gripping and holding of workpieces that have a variety of complex/irregular shapes. Reconfiguration enables lifting and handling one large part or a number of smaller parts simultaneously, providing efficient use of the tooling and resulting in a highly flexible handling device. The on-demand pneumatic system enables idling some branches or grippers of the tooling when not used. For example, the physical shape of the parts being handled may not enable nesting multiple grippers in a pattern that matches the available positions for all of the grippers. In other examples, the shape of a part to be handled may not be best accommodated if gripper locations would result in overcrowded areas when all grippers are employed simultaneously. Idling grippers/branches includes shutting off the pneumatic power to the grippers of the idled branches, which is accomplished without affecting the other grippers in an interlinked pneumatic layout series of grippers. The use of a pushbutton actuated on/off valve to provide on-demand pneumatic power to each gripper individually provides the benefits of simplicity, low-cost and light-weight, without a need for sophisticated control system. The on-demand pneumatic control is automatically provided as a direct result of moving a branch to its homing or idling position during reconfiguration, without affecting the pneumatic power to the other branches.

Figure 1:
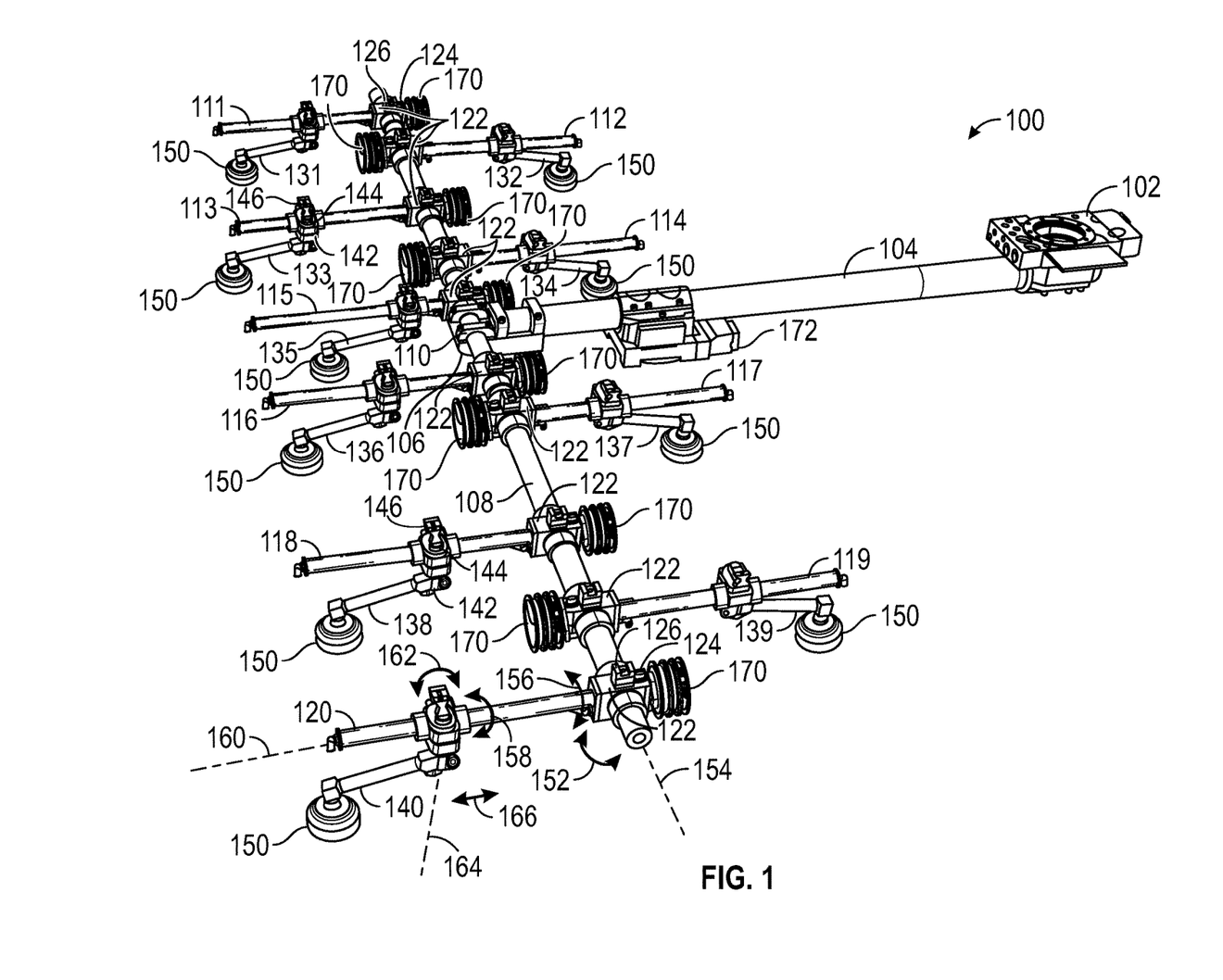
FIG. 1 is a perspective illustration of a reconfigurable tooling device in the form of an end effector, in accordance with various embodiments.

Referring to FIG. 1, illustrated is a device referred to as tooling 100, which is configured as a reconfigurable end effector, in accordance with various embodiments. In other embodiments, the tooling 100 may be referred to as end-of-arm tooling and in either case, may be configured for connection and manipulation by automated machinery. In additional embodiments, the tooling 100 may be configured for manipulation by machinery that is not automated, and/or may be configured for manual manipulation.

In the illustrated embodiment, the tooling 100, as an end effector, includes a tool changer interface 102 for connection with automated machinery such as a robot as further described below. The tool changer interface 102 may include features for effecting releasable mechanical, pneumatic, and/or electric coupling as needed for the application. A master boom 104 extends from the tool changer interface 102 to a connector 106. The connector 106 provides a coupling with a crossbar 108 that extends laterally and bi-directionally from the master boom 104. The connector 106 fixes the crossbar 108 to the master boom 104 by at least one bolted shackle-type cap 110. The lengths of the master boom 104 and the crossbar 108 are selected to accommodate the size of the parts to be lifted and handled. In other embodiments, more than one crossbar 108 may be included.

A number of branch rails 111-120 are connected with the crossbar 108 by joints, referred to as branch locks 122. In the current embodiment, adjacent of the branch rails 111-120 extend in opposite directions from the crossbar 108, with the exception of branch rails 115 and 116 disposed on opposite sides of the master boom 104, which extend in a common direction. In other embodiments, other layout arrangements may be used. The joints are adjustable via the branch locks 122 to enable rotation 152 of the branch rails 111-120 relative to the crossbar 108. In addition, the joints enable translation 156 of the branch rails 111-120 along the crossbar 108. In the current embodiment, the branch locks 122 each include a bolt 124, that when tightened, clamps the respective branch rail 111-120 to the crossbar 108 and when loosened, allows rotation/translation of the respective branch rail 111-120 relative to the crossbar 108. Each branch lock 122 also includes a receiver opening 126, such as for receiving a drive pin that drives movement of the respective branch rail when the bolt 124 is loosened. For example, the disclosure of commonly assigned U.S. Pat. No. 9,656,394 titled Robotic System with Reconfigurable End-effector Assembly, and granted May 23, 2017, is specifically incorporated herein by reference. In other embodiments, the branch locks 122 may be configured, such as with screw/gear mechanisms, to both lock and to rotate the branch rails 111-120 relative to the crossbar 108. For example, the bolts 124, or another drive element, may be driven to rotate the respective branch rail 111-120 relative to the crossbar 108.

Each branch rail 111-120 carries a respective swing arm 131-140, with each respective pair connected by a joint in the form of a swing lock 142. The joints/swing locks 142 are adjustable to enable rotation 158 of the swing arms 131-140 relative to their respective branch rails 111-120. The swing locks 142 also enable rotation 162 of the swing arms 131-140 relative to their respective swing lock 142. In addition, the swing locks 142 enable translation 166 of the swing arms 131-140 along its respective branch rail 111-120. In the current embodiment, the swing locks 142 each include a bolt 144, that when tightened, clamps the respective swing arm 131-140 relative to its branch rail 111-120 and when loosened, allows rotation/translation of the respective swing arm 131-140 relative to its branch rail 111-120. Each swing lock 142 also includes a receiver opening 146, such as for receiving a drive pin that drives movement of the respective swing arm when the bolt 144 is loosened. In other embodiments, the swing locks 142 may be configured, such as with screw/gear mechanisms, to both lock and to rotate the swing arms 131-140.

Each of the swing arms 131-140 carries a gripper 150 on its end opposite the respective swing lock 142. The grippers 150 may be pneumatically operated in a variety of manners. In the illustrated embodiment, the grippers 150 are vacuum cups that grip parts using contained, internal negative pressure for lifting and manipulation of the parts by the tooling 100. Each of the grippers 150 is carried with at least an adjustable five degrees-of-freedom. Through the branch locks 122, the branch rails 111-120, with their respective gripper 150 is rotatable 152 about the longitudinal axis 154 and translatable 156 along the longitudinal axis 154 of the crossbar 108. Through the swing locks 142, each gripper 150 is: rotatable 158 about the longitudinal axis 160 of the branch rails 111-120; rotatable 162 about an axis 164 that is perpendicular to the axis 160 and the axis 154; and translatable 166 along the axis 160. The adjustments enable locating the grippers 150 in a variety of positions to engage with a variety of parts having a complex contoured shape and/or with plural parts simultaneously.

Each branch rail 111-120 is associated with/includes a reel 170, which may be spring loaded to manage pneumatic tubing/hose that distributes pneumatic power in a daisychain fashion. This means each pneumatic gripper 150 is interconnected with the same distributed pneumatic power supply in an interlinked series, which may include parallel and/or in-series connections. The reels 170 are configured to take-up tubing slack and to deliver additional tubing length for accommodating adjustments made during reconfiguration of the tooling 100. As illustrated in FIG. 1, the hosing is generally omitted for simplicity and clarity. However, in the schematic pneumatic diagram of FIG. 3, the circuit is illustrated including the tubing and other conduit components.

As illustrated in FIG. 1, the tooling 100 also includes a repositioning fixture interface 172 for engaging a fixture stand as described in more detail below in association with FIG. 2. The repositioning fixture interface 172 is fixed to the master boom 104 between the crossbar 108 and the tool changer interface 102. The repositioning fixture interface 172 locates the tooling 100 relative to a fixture so that the branch locks 122 and the swing locks 142 may be operated to reposition the grippers 150 of the tooling 100.

Figure 2:
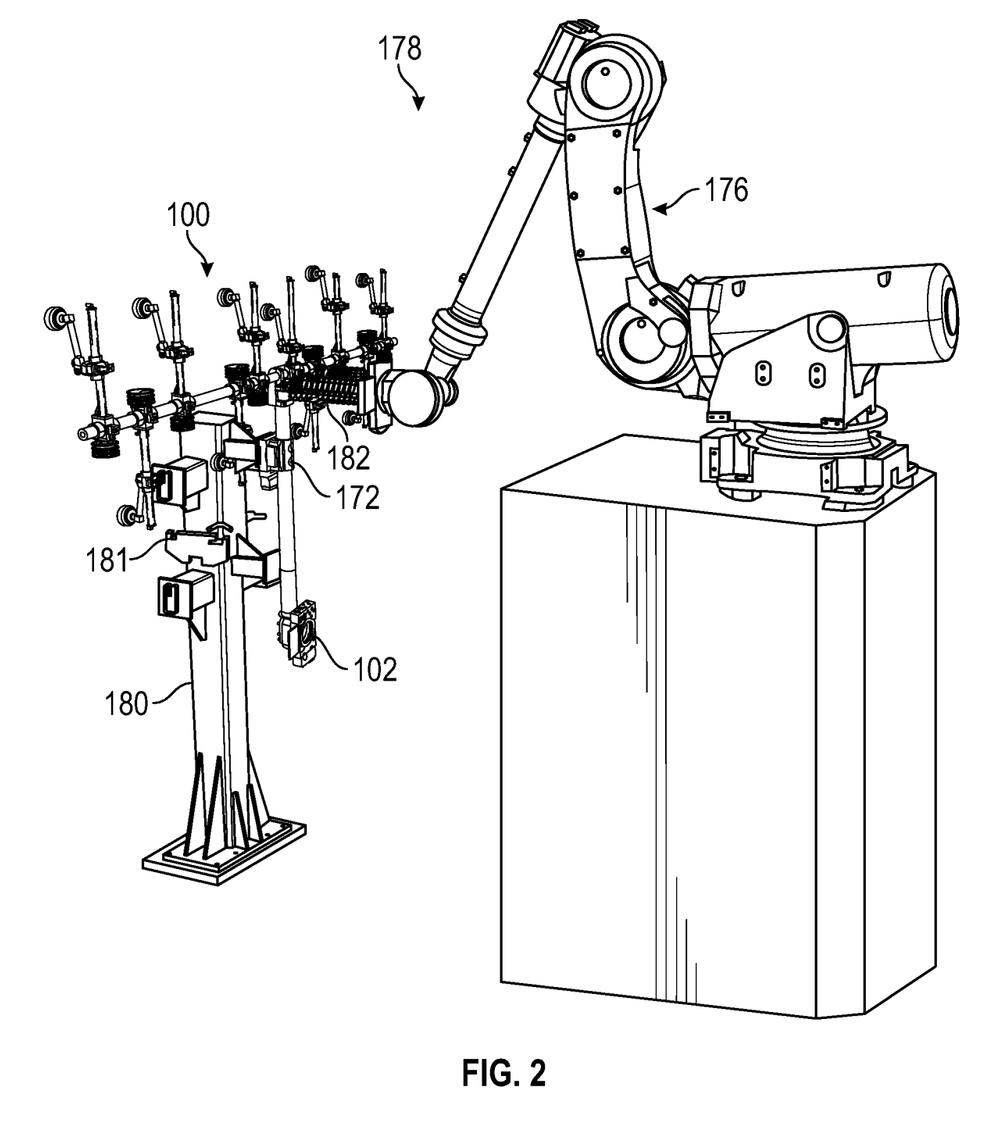
FIG. 2 is a perspective illustration of a reconfiguration cell for the reconfigurable end effector of FIG. 1, in accordance with various embodiments.

Referring additionally to FIG. 2, the tooling 100 is mounted to a repositioning fixture 180. Generally, the tooling 100 is carried by automated machinery in the form of a robot 176, which engages the tool changer interface 102. In this reconfiguration cell 178, the robot 176 has delivered the tooling 100 so that the repositioning fixture interface 172 engages with the repositioning fixture 180, and the robot 176 has then disengaged from the tool changer interface 102. The repositioning fixture 180 holds the tooling 100 while the robot 176 effects reconfiguration of the tooling 100 for picking up and manipulating the intended part or parts. The robot 176 has engaged with a repositioning tool 182, which may have been acquired from a tool holder 181 on the repositioning fixture 180, and is using the repositioning tool 182 to reconfigure the tooling 100. The repositioning tool 182 may include a nut driver that loosens the bolts 124, 144, a pin driver that engages the receiver openings 126, 146 and repositions the grippers 150 by moving the branch rails 111-120 and the swing arms 131-140 to their desired positions. The repositioning tool 182 then relocks the joints using its nut driver feature.

Figure 3:
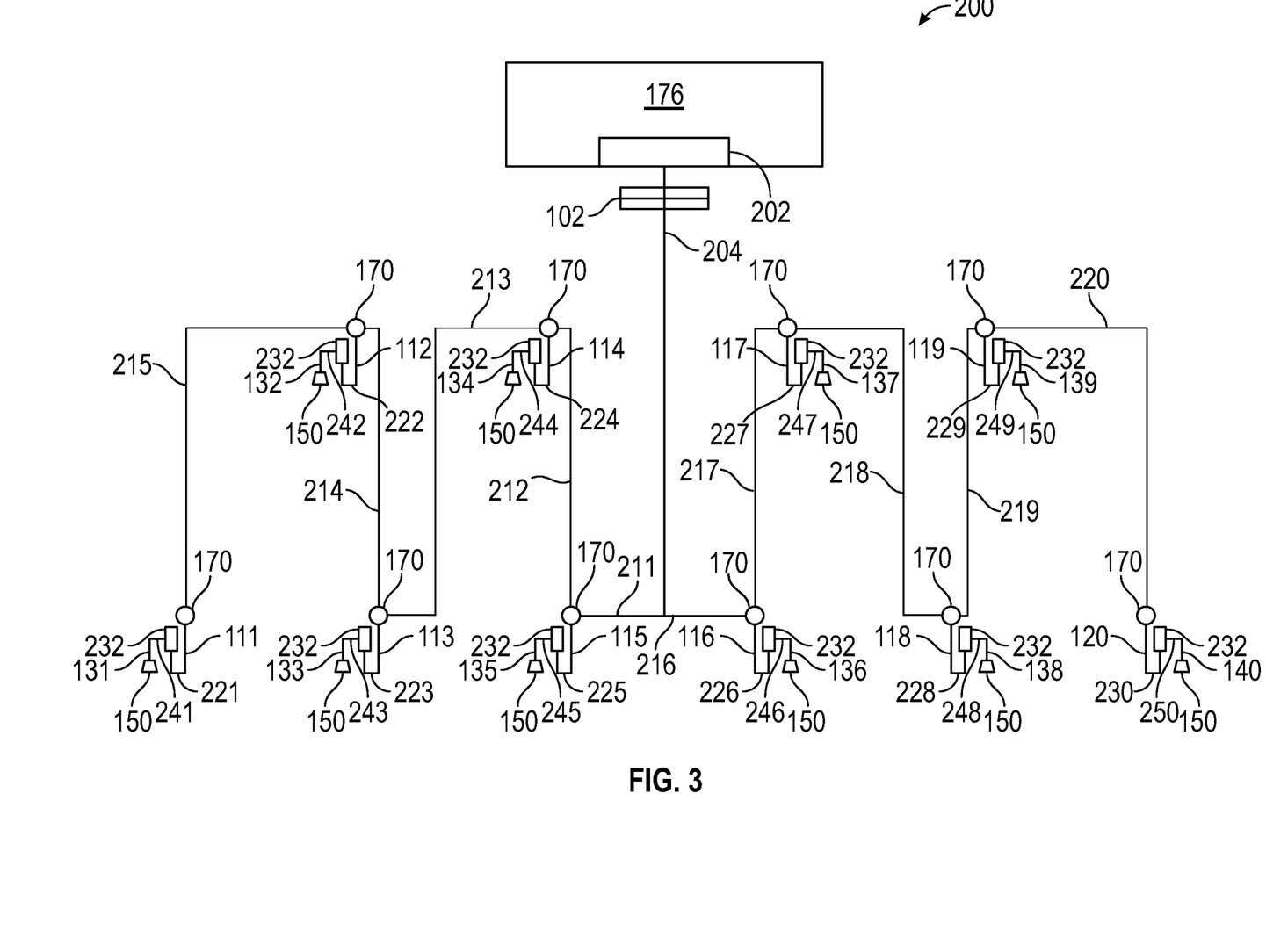
FIG. 3 is a schematic diagram of the pneumatic system for the reconfigurable end effector of FIG. 1, in accordance with various embodiments.
Figure 4:
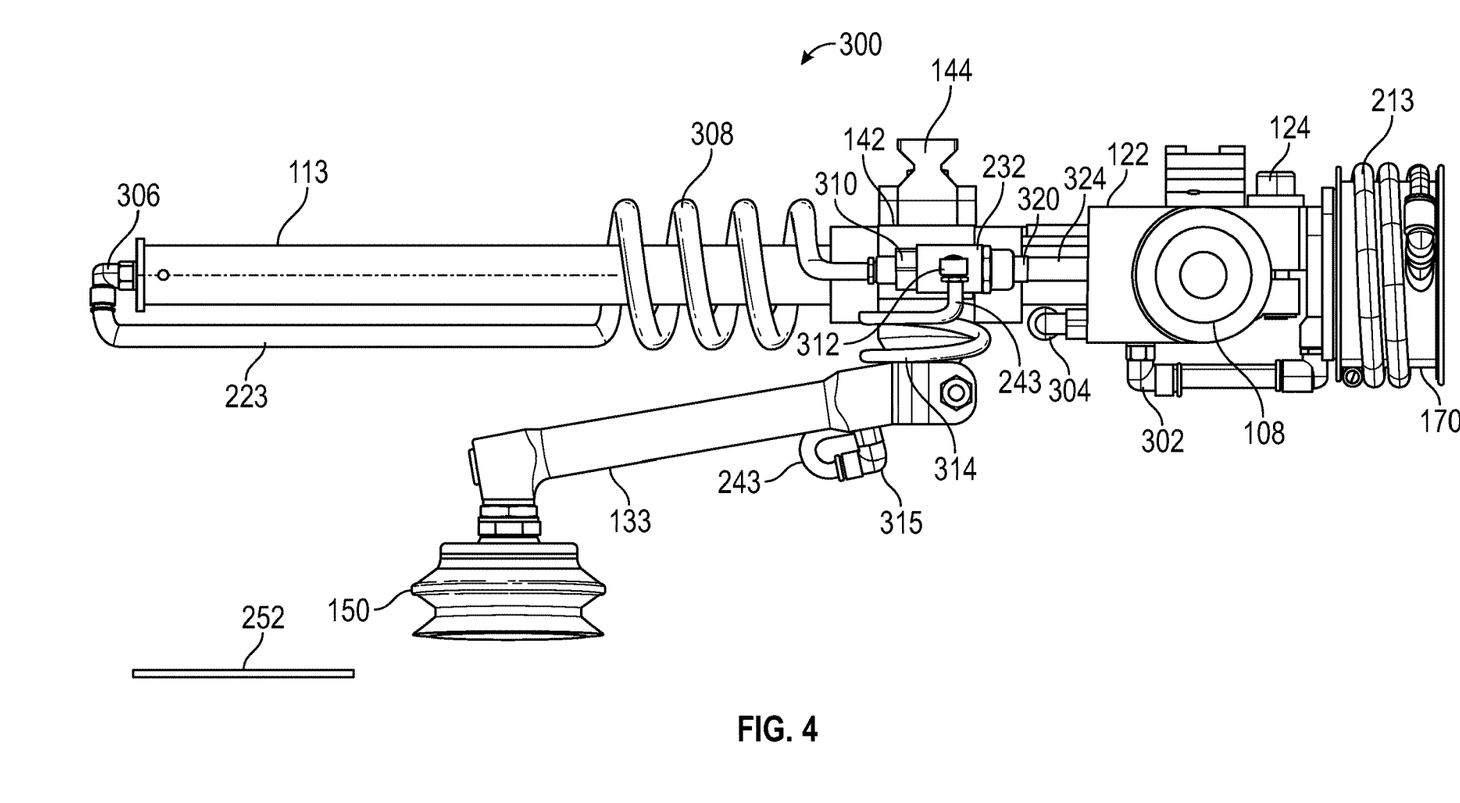
FIG. 4 is a detail, perspective illustration of one branch of the reconfigurable end effector of FIG. 1, in accordance with various embodiments.

The pneumatic circuit 200 of the tooling 100 is illustrated in FIG. 3, to which reference is additionally directed. The circuit 200 distributes pneumatic power from a pneumatic power supply 202 at the robot 176 to the pneumatic grippers 150. Each vacuum cup style gripper 150 is normally open to, and is interconnected with, each other gripper 150 and with the pneumatic power supply 202, such as through the tool changer interface 102. As a result, if a gripper 150 is not in contact with a part to be handled (such as illustrated in FIG. 4), a vacuum leak would exist, if the pneumatic power to that gripper is not shut off. The pneumatic circuit 200 includes a main branch 204. The main branch 204 comprises one or more pneumatic tubes which generally run along the master boom 104 of the tooling 100. A side branch chain of tubes 211-215 and a side branch chain of tubes 216-220 are connected with the main branch 204. In the current embodiment, the side branch chains 211-215 and 216-220 comprise pneumatic tubes that run from the main branch 204 to, and around, the reels 170. The tubes 211-215 supply pneumatic power to the branches associated with the branch rails 111-115. The tubes 216-220 supply pneumatic power to the branches associated with branch rails 216-220. From the side branch chains via the tubes 211-215/reels 170, and the tubes 216-220/reels 170, the circuit 200 continues through the branch rails 111-120. For example, the branch rails 111-120 comprise hollow structural tubes through which the pneumatic power is channeled. From the branch rails 111-120, the pneumatic circuit 200 emerges and is channeled through pneumatic tubing 221-230, each of which extends to a respective pneumatic valve 232. The valves 232 effect on-demand control the supply of pneumatic power to the grippers 150 as described in greater detail below. From the valves 232, the pneumatic circuit 200 extends through tubing 241-250 and into the swing arms 131-140. For example, the swing arms 131-140 comprise hollow structural tubes through which the pneumatic power is channeled to the grippers 150. Through the pneumatic circuit 200, pneumatic power is distributed to all of the pneumatic grippers 150 in a daisy-chain fashion.

Referring to FIG. 4, one branch 300 of the tooling 100 is illustrated in isolation. The branch 300 corresponds to the branch of FIG. 1 with the branch rail 113 and is representative of each of the ten branches of the tooling 100 illustrated in FIG. 1. In general, the branch 300 includes the branch rail 113, the branch lock 122, the swing lock 142, the swing arm 133, the pneumatic tubing 223, 243, the valve 232 and the pneumatic gripper 150. The bolt 144 enables adjustment of the swing arm 133. The incoming pneumatic supply from the side branch chain via tube 213 (FIG. 3), enters through a fitting 302 and is communicated internally through the branch rail 113. Another fitting 304 distributes the pneumatic power onward, in this case to the next branch in the chain, which is to the branch with the branch rail 111 shown in FIG. 1.

In the branch 300, the pneumatic power passes internally through the branch rail 113 and exits through a fitting 306 for communication into and through tubing 223. The tubing 223 includes a spiral segment 308 for expansion and contraction when the swing lock 142 and swing arm 133 are repositioned along the branch rail 113. The tubing 223 is connected with a port 310 of the valve 232. The tubing 243 is connected with a second port 312 of the valve 232. The tubing 243 includes a spiral segment 314 for flexibility and is connected with the swing arm 133 by a fitting 315 to pass the pneumatic power into and through the swing arm 133 as a conduit. The pneumatic power is communicated through the valve 232 (when open), through the tubing 243 and into the swing arm 133. The pneumatic power passes through the swing arm 133 and exits into the vacuum cup style gripper 150 providing a suction function. In this case, the individual illustrated gripper 150 is located to not be in contact with the part 252 being handled by the tooling 100 and gripper by others of the grippers 150. Accordingly, the branch 300 is idled and the valve 232 is closed.

Figure 5:
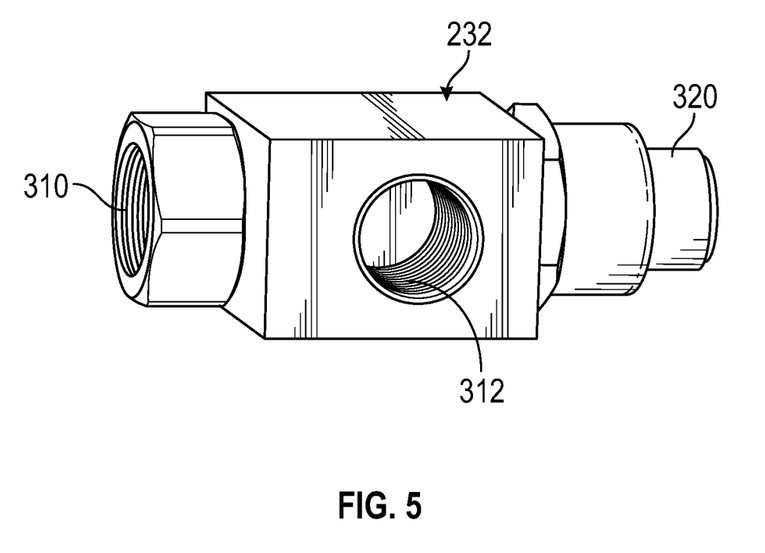
FIG. 5 is perspective illustration of a valve of the end effector branch of FIG. 4, in accordance with various embodiments.
Figure 6:
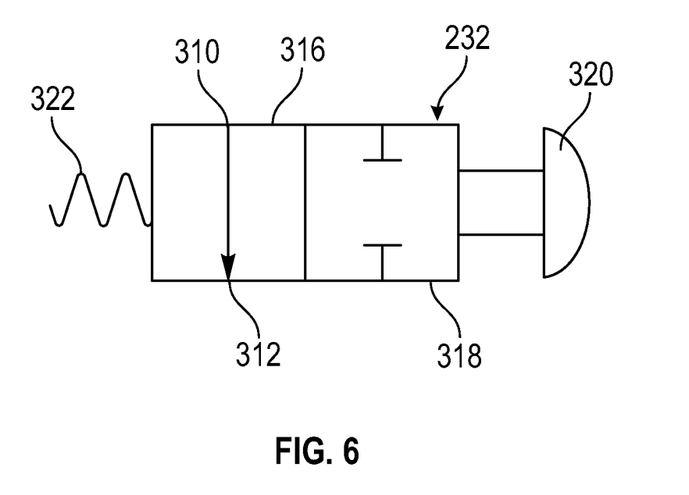
FIG. 6 is schematic diagram of the valve of FIG. 5 in a normally open state, in accordance with various embodiments.

Referring to FIGS. 5 and 6 along with FIG. 4, the valve 232 is a two-port, two position valve with an open state 316 and a closed state 318. The valve 232 is mechanically actuated by a push button 320 actuator, and is spring 322 (internal in FIG. 5), returned to its normally open state. As illustrated in FIG. 4, the swing lock 142 is moved to a home position, which forces the push button 320 against a block 324 on the branch lock 122 that actuates the valve 232 moving it to the closed state 318. The block 324 extends from the branch lock 122 and may take a variety of forms such as a pin, an arm, a flat surface, or others, to engage the push button 320. With the valve 232 closed, the pneumatic power is shut off to the swing arm 133 and to its gripper 150, idling the branch 300. The pneumatic power continues to pass on the adjacent branch through the fitting 304 and the other grippers 150 in the chain may remain active. Idling of the branch 300 may be accomplished by moving it to the home position during reconfiguration of the tooling in the reconfiguration cell 178 as shown in FIG. 2. The valve 232 is closed as a result of movement during the reconfiguration which actuates the push button 320 by engagement with the block 324, without a need for additional action.

Through the embodiments disclosed herein, reconfigurable end of arm tooling with pneumatic powered grippers provides secure gripping and holding of workpieces that have a variety of complex/irregular shapes. The reconfigurable end of arm tooling is adaptable to handle both large and small parts, and enables idling some branches or grippers when not used, such as to make space for the others. Idling includes shutting off the pneumatic power to the grippers of the idled branches, which is accomplished by closing a valve without affecting the other grippers in a daisy-chained pneumatic layout. The pneumatic power is shut of to select grippers automatically as a result of moving the affected branch to its home position during routine reconfiguration of the tooling to adapt to the part or parts that will be lifted and manipulated. The valve is actuated to a closed state when the idled branch is moved to a home position by means of the valve's actuator engaging a part of the tooling as a result of reaching the home position. The valve is actuated without electrical power and without sophisticated controls.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A tooling system for gripping a workpiece, the system comprising:
   a plurality of grippers configured to engage and grip the workpiece;
   an arm connected with a first gripper of the plurality of grippers;
   a lock configured to releasably lock the arm in a number of positions, including a home position;
   a conduit circuit coupled with the first gripper, the circuit configured to communicate a pneumatic power from a pneumatic power supply to the first gripper;
   a valve disposed in the conduit circuit, the valve repositionable between an open state and a closed state,
   wherein the valve is configured to move to the closed state in response to movement of the arm to the home position.

2. The system of claim 1, wherein the pneumatic power is configured to be delivered to the first gripper through the arm.

3. The system of claim 1, wherein the valve includes a push button configured to engage the tooling system to move the valve to the closed state when the arm is moved to the home position.

4. The system of claim 1, comprising a branch rail, wherein the arm is connected with the branch rail through the lock, wherein the pneumatic power is communicated to the first gripper through the branch rail.

5. The system of claim 1, wherein the valve comprises a two-position, on-off mechanically actuated valve.

6. The system of claim 1, wherein the tooling system comprises an end effector of a robot, and comprising:
   a tool changer interface configured to releasably couple the end effector with the robot; and
   a repositioning fixture interface configured to releasably couple the end effector with a repositioning fixture.

7. The system of claim 6, wherein the robot is configured to:
reposition the end effector when the end effector is coupled with a repositioning fixture; and
move the arm to the home position, closing the valve and idling the first gripper while others of the plurality of grippers remain active.

8. The system of claim 1, wherein the arm is part of a branch of the tooling system that is configured to be repositionable with five degrees of freedom.

9. The system of claim 1, comprising:
a branch rail, wherein the arm is connected with the branch rail through the lock;
a crossbar, wherein the branch rail is connected with the cross bar through a branch lock that includes a block,
wherein the valve includes a push button actuator,
wherein the push button is forced against the block when the arm is moved to the home position,
wherein the valve is disposed in a closed state when the push button is forced against the block.

10. The system of claim 9, wherein the valve is a mechanically actuated two position on-off valve.

11. A tooling system for gripping workpieces, the system comprising:
a plurality of grippers configured to engage and grip the workpieces;
arms, one of which is connected with each gripper of the plurality of grippers;
locks, one of which is connected with each of the arms, the locks releasably locking the arms in a plurality of positions, including home positions;
a bolt on each of the locks to alternately release and lock the arm in each of the plurality of positions;
a conduit circuit coupled with the plurality of grippers, the conduit circuit communicating a pneumatic power to the plurality of grippers;
a valve on each one of the arms and disposed in the conduit circuit before each one of the plurality of grippers, each valve repositionable between an open state and a closed state,
wherein when one of the arms is moved to the home position, the valve on the one of the arms is moved to the closed state in response to moving the arm to the home position.

12. The system of claim 11, wherein the pneumatic power is delivered to each of the plurality of grippers through the arms.

13. The system of claim 11, wherein the valves each include a push button configured to engage the tooling system to move the valve to the closed state when the arm on which the valve is disposed is moved to the home position.

14. The system of claim 11, comprising branch rails, wherein the arms are connected with the branch rails through the locks, wherein the pneumatic power is communicated to the plurality of grippers through the branch rails.

15. The system of claim 11, wherein each valve comprises a two-position, on-off mechanically actuated valve.

16. The system of claim 11, wherein the tooling system comprises an end effector of a robot, and comprising a tool changer interface configured to releasably couple the end effector with the robot; and a repositioning fixture interface configured to releasably couple the end effector with a repositioning fixture.

17. The system of claim 16, wherein the robot is configured to:
reposition the end effector when the end effector is coupled with a repositioning fixture; and
move at least one of the arms to the home position, closing the valve on the at least one of the arms, and idling the gripper on the at least one of the arms, while others of the plurality of grippers remain active.

18. The system of claim 11, wherein each arm is part of a branch of the tooling system that is configured to be repositionable with five degrees of freedom.

19. The system of claim 11, comprising:
branch rails, wherein the arms are connected with the branch rails through the locks;
a crossbar, wherein the branch rails are connected with the cross bar through branch locks that include blocks,
wherein the valves include push button actuators,
wherein, one of the push buttons is disposed against one of the blocks when one of the arms is moved to the home position,
wherein the valve on the one of the arms is in a closed state when the one of the push buttons is disposed against the one of the blocks.

20. A tooling system for gripping workpieces, the system comprising:
a master boom;
a crossbar coupled with the master boom;
a plurality of branch rails coupled with the crossbar and selectively repositionable relative to the crossbar;
a plurality of swing arms, one of which is coupled with each branch rail in the plurality of branch rails, each swing arm repositionable relative to its respective branch rail;
a plurality of pneumatic grippers, one of which is coupled with each swing arm in the plurality of swing arms;
a valve on each arm in the plurality of swing arms and disposed in a conduit circuit between a respective pneumatic gripper in the plurality of grippers and a pneumatic power supply, each valve repositionable between an open state and a closed state,
a tool changer interface on the master boom, the tool changer interface configured to releasably couple with the robot;
a repositioning fixture interface on the master boom, the repositioning fixture interface configured to releasably couple with a repositioning fixture,
wherein the robot is configured to:
reposition the branch arms and the swing arms when the repositioning fixture interface is coupled with the repositioning fixture; and
move at least one of the swing arms to the home position, closing the valve on the at least one of the arms, and idling the pneumatic gripper on the at least one of the arms, while others of the plurality of pneumatic grippers remain active.

\* \* \* \* \*